May 31, 1960
W. J. SWANSON
2,939,125
TIDE INDICATOR
Filed Oct. 11, 1957
2 Sheets-Sheet 1
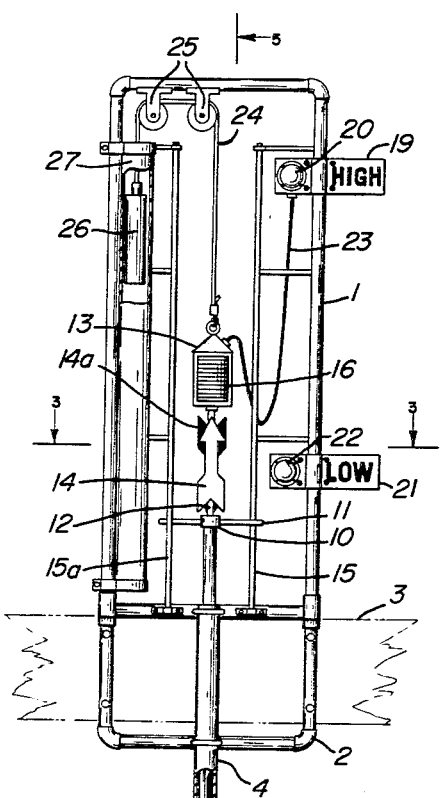
FIG. 1
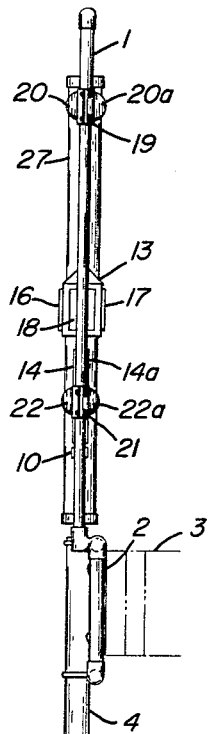
FIG. 2
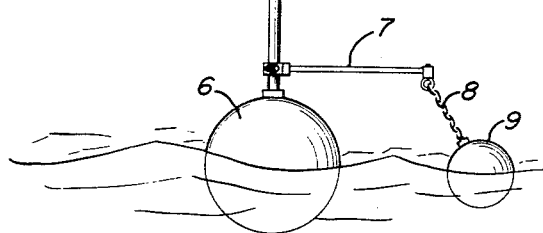
INVENTOR.
WILLIAM J. SWANSON
BY:
ATTORNEY May 31, 1960 W. J. SWANSON 2,939,125
TIDE INDICATOR
Filed Oct. 11, 1957 2 Sheets-Sheet 2
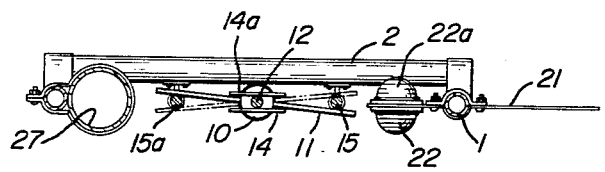
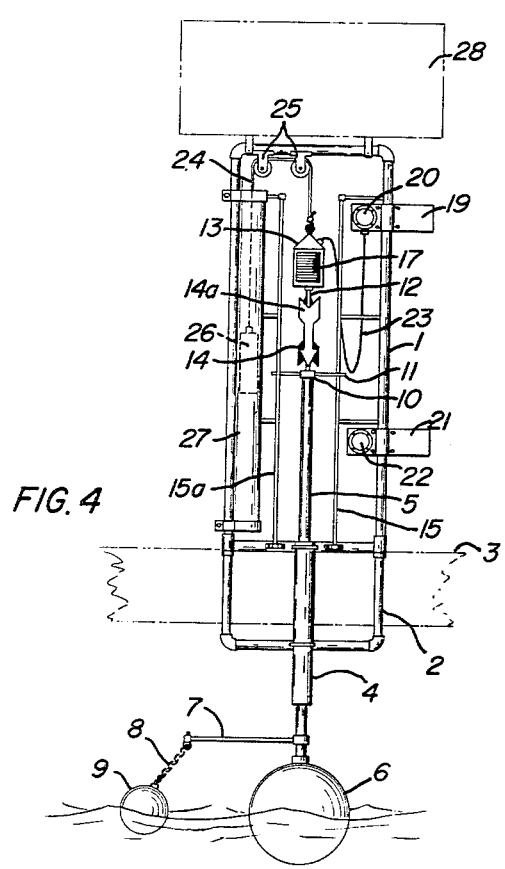
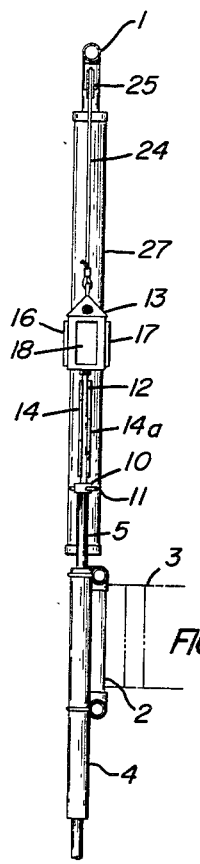
INVENTOR.
WILLIAM J. SWANSON
BY:
ATTORNEY "United States Patent Office"

2,939,125
Patented May 31, 1960

2,939,125
TIDE INDICATOR

William J. Swanson, 359 Walker St., Fairview, N.J.

Filed Oct. 11, 1957, Ser. No. 689,725

5 Claims. (Cl. 340—239)

This invention relates to a tide indicator and its object is to visually indicate by day and by night in tidal waters, whether the tide is incoming, outgoing or at a turn, and its approximate stage.

Another object is to provide an indicator that is rugged and will function under adverse weather conditions.

A further object is to permit economical production of tide indicators embodying this invention and ease of maintenance.

Other objects will appear from the description which follows.

These objects are accomplished by mounting upon a fixed frame visible means that rise and fall with the tide because of a rigid attachment to a captive float partially submerged in the water.

In the drawings in which the same number refers to the same or a similar part:

Figure 1 is a front elevational view partly in section of a tide indicator in which a rising tide is indicated.

Figure 2 is a side elevational view of Figure 1.

Figure 3 is a sectional view on line 3—3 of Figure 1.

Figure 4 is a front elevational view in which a falling tide is indicated.

Figure 5 is a sectional view along line 5—5 of Figure 1.

Referring to Figure 1, it will be observed that the indicator is constructed upon frame 1 formed with metal tubular members. Offset portion 2 of frame 1 is secured to mounting surface 3 indicated in broken outline and which may be part of a bulkhead, pier or other structure. Attached to frame 1 is guide tube 4, which by reason of offset portion 2 clears, along with the main portion of frame 1, the mounting surface 3.

Rod 5 is a rigid member rotatable and slidable in guide tube 4. Attached at the lower end of rod 5 are relatively heavy float 6 and guide float arm 7. At the free end of guide float arm 7 is a short flexible connection, chain 8, with guide float 9. The purpose in weighting float 6 is to make it less responsive to the waves or swells that might be created in the vicinity by passing boats and thus to steady the indicating features of the device.

At the upper end of rod 5 cap 10 is fixed and projecting in opposite directions therefrom are fixed arms 11. Post 12, rigidly mounted in cap 10, supports lamp 13, and indicating arrows 14 and 14a. Fixed rigid vertical rods 15 and 15a are secured to frame 1 in such a manner that the circular movement of arms 11 is limited to an arc of 180 degrees. Rod 5 is suspended from cable 24 which passes over pulleys 25 and thence into guide tube 27, within which it supports counterweight 26.

Lamp 13 has in one face lens 16 which may be green in color. In the opposite face it has lens 17 which may be red in color. Lens 18 in another face, may be a clear lens or of a color other than that of either lens 16 or 17. Wire 23 provides an electrical connection between lamp 13 and the electric circuit which feeds light 20.

Light 20 is mounted on board 19 upon which the word "High" appears. Light 22 is mounted on board 21 upon which the word "Low" appears. Both board 19 and board 21 are adjustably mounted on the vertical side member of frame 1. The electrical circuit by which current is brought to lights 20 and 22 may be in any conventional form and is not shown in the drawings.

If it is desired to have display advertising associated with the indicator, display panel 28 may be added to the top of frame 1, as shown in broken outline in Figure 4.

The placement and operation of the tide indicator is as follows.

The indicator is mounted to face the observer or user, and in the figures the mounting is shown as parallel with the tidal flow. If the indicator is to be mounted transverse to the tidal flow, a modification in the position of arms 11 is required. In such mounting the arrow position will show a boatman whether he is going with, or against, the tide, and lens 16 and 17 need not be of distinctive colors.

When the current is flowing upstream, guide ball 9 will tend to go with the current and will turn rod 5 into the position shown in Figure 1. In this position upward pointing arrow 14 indicates that the tide is flowing in, and lens 16 of lamp 13, which remains lighted at all times, will further indicate the tidal direction by the color of lens 16. As float 6 rises it will move lamp 13 closer to the "High" marker. When the tidal flow reverses, rod 5 will, by the change in direction of float 9, be rotated in an 180 degree arc and the down arrow and lens 17 will be exposed to the observer. As the tide falls, lamp 13 will descend toward the "Low" marker as shown in Figure 4.

By keeping chain 8 short, it is prevented from becoming entangled with rod 5 and float 6.

When the tide is on a turn, it is possible that rod 5 will be quarter turned, thus exposing lens 18 of lamp 13 to the observer. By having this lens a distinctive color, this condition of the tide will be made known. Lights 20 and 22, although fixed, may have lens 20a and 22a of different color in their rear faces.

To protect float 6 and guide float 9 from ice or floating debris, a suitable wire enclosure through which the water may flow, can be provided.

It will be seen that an observer will be able to determine the relative elevation of the water to mean high and mean low tides, and because of the arrow which will be positioned to face him, will know the direction of the tidal flow.

There may, of course, be many variations in the materials used and in the specific form of construction employed, and I do not, therefore, limit myself in the scope of my invention by the specific illustration herein given.

What I claim is:

1. A tide indicator comprising a rigid vertical frame; a pair of horizontal rings coaxially mounted thereon; a rod rotatably and slidably suspended for part of its length within such rings; a cable passed over a pulley hung from the top of the frame attached at one end to the top of the rod and at its other end to a weight; a float fixed to the lower end of the rod; a second float secured by a flexible member to the lower end of the rod; a lamp mounted adjacent the top of the rod; an upward pointing indicating arrow and a downward pointing indicating arrow mounted on opposite sides of the rod below the lamp; a pair of fixed arms extending radially outward from the rod in opposite directions from each other adapted to cooperate with the vertical frame to limit the rotation of the rod; and lights and indicia adjustably mounted on the side of the said frame.

2. A tide indicator comprising a rigid vertical frame; a tube open at both ends vertically secured thereto; a rod rotatably and slidably suspended for part of its length within such tube; a float fixed to the lower end of the rod; a rigid arm fixed at right angles to the rod adjacent its lower end; a second float secured by a flexible member to the free end of such arm; a lamp mounted on the rod adjacent the top of the rod; an upward pointing indicating arrow and a downward pointing indicating arrow mounted on opposite sides of the rod below the lamp; and lights and indicia adjustably mounted on the side of the said frame.

3. A tide indicator comprising a rigid vertical frame; a tube open at both ends vertically secured thereto; a rod rotatably and slidably suspended for part of its length within such tube; a cable passed over a pulley hung from the top of the frame attached at one end to the top of the rod and at its other end to a weight; a float fixed to the lower end of the rod; a rigid arm fixed at right angles to the rod adjacent its lower end; a second float secured by a flexible member to the free end of such arm; a lamp mounted on the rod adjacent the top of the rod; an upward pointing indicating arrow and a downward pointing indicating arrow mounted on opposite sides of the rod below the lamp; and lights and indicia adjustably mounted on the side of the said frame.

4. A tide indicator comprising a rigid vertical frame; a tube open at both ends vertically secured thereto; a rod rotatably and slidably suspended for part of its length within such tube; a float fixed to the lower end of the rod; a rigid arm fixed at right angles to the rod adjacent its lower end; a second float secured by a flexible member to the free end of such arm; a lamp mounted on the rod adjacent the top of the rod; an upward pointing indicating arrow and a downward pointing indicating arrow mounting on opposite sides of the rod below the lamp; a pair of vertical members attached to the frame parallel and adjacent to the rod on opposite sides thereof; a pair of fixed arms extending radially outward from the rod in opposite directions from each other and adapted to cooperate with the aforementioned members to limit the rotation of the rod; and lights and indicia adjustably mounted on the side of the said frame.

5. A tide indicator comprising a rigid vertical frame; a tube open at both ends vertically secured thereto; a rod rotatably and slidably suspended for part of its length within such tube; a cable passed over a pulley hung from the top of the frame attached at one end to the top of the rod and at its other end to a weight; a float fixed to the lower end of the rod; a rigid arm fixed at right angles to the rod adjacent its lower end; a second float secured by a short flexible member to the free end of such arm; a lamp mounted on the rod adjacent the top of the rod; an upward pointing indicating arrow and a downward pointing indicating arrow mounted on opposite sides of the rod below the lamp; a pair of vertical members attached to the frame parallel and adjacent to the rod on opposite sides thereof; a pair of fixed arms extending radially outward from the rod in opposite directions from each other and adapted to cooperate with the aforementioned vertical members to limit the rotation of the rod; and lights and indicia adjustably mounted on the side of the said frame.

References Cited in the file of this patent
UNITED STATES PATENTS

| 419,608 | Maret | Jan. 14, 1890 |
| 525,000 | Bradley | Aug. 28, 1894 |
| 2,607,835 | Bonar | Aug. 19, 1952 |